US 9,350,888 B2

(12) United States Patent
Kanaya

(10) Patent No.: US 9,350,888 B2
(45) Date of Patent: May 24, 2016

(54) IMAGE-READING APPARATUS

(71) Applicant: PFU Limited, Ishikawa (JP)

(72) Inventor: Shingo Kanaya, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 14/460,023

(22) Filed: Aug. 14, 2014

(65) Prior Publication Data

US 2015/0319324 A1    Nov. 5, 2015

(30) Foreign Application Priority Data

Apr. 30, 2014   (JP) .................................. 2014-094009

(51) Int. Cl.
H04N 1/04      (2006.01)
H04N 1/00      (2006.01)
H04N 1/387     (2006.01)

(52) U.S. Cl.
CPC ....... *H04N 1/00644* (2013.01); *H04N 1/00588* (2013.01); *H04N 1/00663* (2013.01); *H04N 1/00689* (2013.01); *H04N 1/00771* (2013.01); *H04N 1/387* (2013.01)

(58) Field of Classification Search
None
See application file for complete search history.

(56) References Cited

U.S. PATENT DOCUMENTS

| | | | |
|---|---|---|---|
| 5,502,556 A * | 3/1996 | Yamada ......................... | 399/374 |
| 5,539,445 A | 7/1996 | Muramatsu et al. | |
| 5,694,315 A * | 12/1997 | Huang et al. ...................... | 700/1 |
| 5,880,858 A * | 3/1999 | Jin ..................... | H04N 1/00681 358/453 |
| 6,111,667 A * | 8/2000 | Mishima .................. | G06K 9/32 358/401 |
| 6,480,688 B1 * | 11/2002 | Yasui ............................ | 399/194 |
| 6,552,828 B1 * | 4/2003 | Gatto ............................ | 358/496 |
| 6,643,028 B1 * | 11/2003 | Ogaki et al. ................... | 358/1.6 |
| 6,791,723 B1 * | 9/2004 | Vallmajo ............ | H04N 1/00132 358/444 |
| 7,194,144 B1 * | 3/2007 | Sakai et al. ................... | 382/284 |
| 7,289,242 B2 * | 10/2007 | Lai ......................... | H04N 1/203 358/1.6 |
| 7,688,475 B2 * | 3/2010 | Yoo ..................... | G03G 15/607 358/403 |

(Continued)

FOREIGN PATENT DOCUMENTS

JP    05-181330 A    7/1993
JP    2002-010059 A  1/2002

(Continued)

OTHER PUBLICATIONS

Notice of Rejection Japanese Patent Application No. 2014-094009 dated Feb. 17, 2015 with full English translation.

(Continued)

*Primary Examiner* — Madelein Nguyen
(74) *Attorney, Agent, or Firm* — McDermott Will & Emery LLP

(57) ABSTRACT

An image-reading apparatus includes a housing having an insertion slot for inserting single medium or plural media, a conveying unit that conveys the single medium or plural media into the housing, an image capturing unit that captures an image of the single medium or plural media conveyed, a control unit that controls at least the conveying unit and the image capturing unit, and an image processor configured to generate a captured image including single medium image or plural media image, and clip a plurality of medium images that correspond respectively to media images in the plural media image off the captured image when the generated captured image includes the plural media image in a direction along a width direction of the insertion slot. The image processor outputs the plurality of medium images clipped in an order of insertion of the plural media.

3 Claims, 13 Drawing Sheets

(56) References Cited

U.S. PATENT DOCUMENTS

| | | | |
|---|---|---|---|
| 8,670,163 B2* | 3/2014 | Takahashi | H04N 1/031 358/474 |
| 8,730,529 B2* | 5/2014 | Link | H04N 1/00708 358/449 |
| 8,964,239 B2* | 2/2015 | Prabhu et al. | 358/1.18 |
| 2002/0051248 A1* | 5/2002 | Cook | H04N 1/4097 358/488 |
| 2003/0111602 A1* | 6/2003 | Sato et al. | 250/310 |
| 2005/0097046 A1* | 5/2005 | Singfield | G06Q 20/042 705/42 |
| 2005/0157934 A1* | 7/2005 | Tanabe et al. | 382/232 |
| 2006/0055986 A1* | 3/2006 | Yasuda | 358/474 |
| 2006/0209326 A1* | 9/2006 | Higashiura | 358/1.9 |
| 2006/0245018 A1* | 11/2006 | Byun | 358/527 |
| 2006/0280534 A1* | 12/2006 | Cook et al. | 399/374 |
| 2007/0013974 A1* | 1/2007 | Hattori | 358/486 |
| 2007/0058994 A1* | 3/2007 | Yaguchi | 399/17 |
| 2007/0086816 A1* | 4/2007 | Iwago | G03G 15/602 399/367 |
| 2007/0090591 A1* | 4/2007 | Roberts | B65H 7/125 271/258.01 |
| 2007/0121127 A1* | 5/2007 | Minowa et al. | 358/1.6 |
| 2007/0236755 A1* | 10/2007 | Liao | 358/488 |
| 2008/0100885 A1* | 5/2008 | Onishi | 358/488 |
| 2008/0104707 A1* | 5/2008 | Saka et al. | 726/26 |
| 2008/0240743 A1* | 10/2008 | Chen et al. | 399/16 |
| 2008/0266535 A1* | 10/2008 | Narusawa | 355/41 |
| 2009/0039594 A1* | 2/2009 | Sato et al. | 271/258.01 |
| 2009/0240982 A1* | 9/2009 | Ogasawara | 714/16 |
| 2009/0315240 A1* | 12/2009 | Myoki | G03G 15/6582 270/21.1 |
| 2009/0316164 A1* | 12/2009 | Takahashi | B41J 29/38 358/1.8 |
| 2010/0007931 A1* | 1/2010 | Wang et al. | 358/498 |
| 2010/0118357 A1* | 5/2010 | Kwon | B65H 5/062 358/498 |
| 2010/0134839 A1* | 6/2010 | Hibino et al. | 358/1.15 |
| 2011/0038014 A1* | 2/2011 | Ito | 358/406 |
| 2011/0052240 A1* | 3/2011 | Ikeda | 399/81 |
| 2011/0069359 A1* | 3/2011 | Tojo | 358/498 |
| 2011/0090545 A1* | 4/2011 | Chen | 358/498 |
| 2011/0122462 A1* | 5/2011 | Shoda | 358/498 |
| 2011/0267658 A1* | 11/2011 | Maeshima et al. | 358/448 |
| 2011/0292434 A1* | 12/2011 | Lim et al. | 358/1.15 |
| 2011/0317230 A1* | 12/2011 | Tanaka | B65H 3/063 358/498 |
| 2012/0105918 A1* | 5/2012 | Fan et al. | 358/462 |
| 2012/0300239 A1* | 11/2012 | Ueno et al. | 358/1.13 |
| 2012/0300264 A1* | 11/2012 | Okumura et al. | 358/448 |
| 2013/0027756 A1* | 1/2013 | Yamada | 358/448 |
| 2013/0057888 A1* | 3/2013 | Dohi | 358/1.13 |
| 2013/0126614 A1* | 5/2013 | Lebashchi et al. | 235/440 |
| 2013/0328258 A1* | 12/2013 | Mutsuno | B42B 4/00 270/1.01 |
| 2014/0036289 A1* | 2/2014 | Muroi | 358/1.13 |
| 2014/0079456 A1* | 3/2014 | Nakajima et al. | 399/367 |
| 2014/0092447 A1* | 4/2014 | Lee | 358/497 |
| 2014/0092449 A1* | 4/2014 | Lee | 358/498 |
| 2014/0240771 A1* | 8/2014 | Kuroda | 358/1.15 |
| 2015/0103366 A1* | 4/2015 | Kuroda | H04N 1/2369 358/1.13 |
| 2015/0109642 A1* | 4/2015 | Gabe | 358/448 |
| 2015/0256697 A1* | 9/2015 | Kosaka | H04N 1/00809 358/448 |

FOREIGN PATENT DOCUMENTS

| | | |
|---|---|---|
| JP | 2005-111668 A | 4/2005 |
| JP | 2005-189421 A | 7/2005 |
| JP | 2006-171869 A | 6/2006 |
| JP | 2007-235885 A | 9/2007 |
| JP | 2007-281983 A | 10/2007 |
| JP | 2008-252385 A | 10/2008 |
| JP | 2009-100211 A | 5/2009 |
| JP | 2010-088048 A | 4/2010 |
| JP | 2010-098680 A | 4/2010 |
| JP | 2011-228963 A | 11/2011 |
| JP | 2011-244352 A | 12/2011 |
| JP | 2011-254249 A | 12/2011 |

OTHER PUBLICATIONS

Decision of a Patent Grant Japanese Patent Application No. 2014-094009 dated May 26, 2015 with English translation.

* cited by examiner

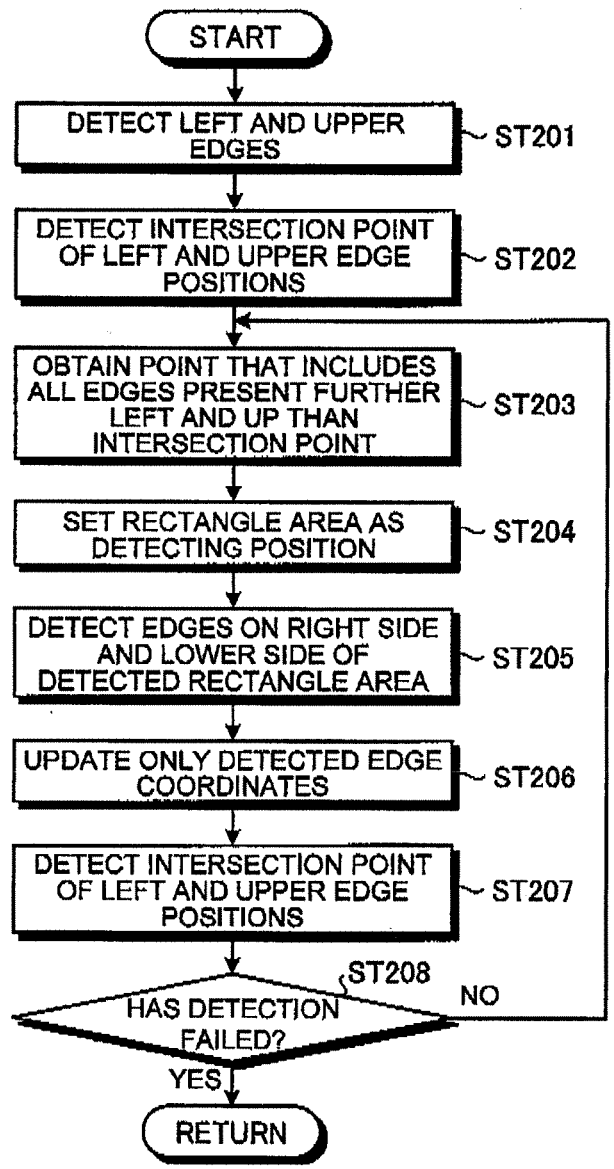

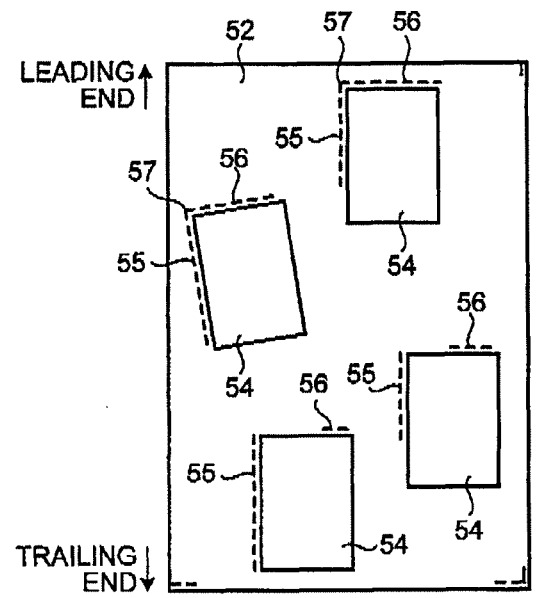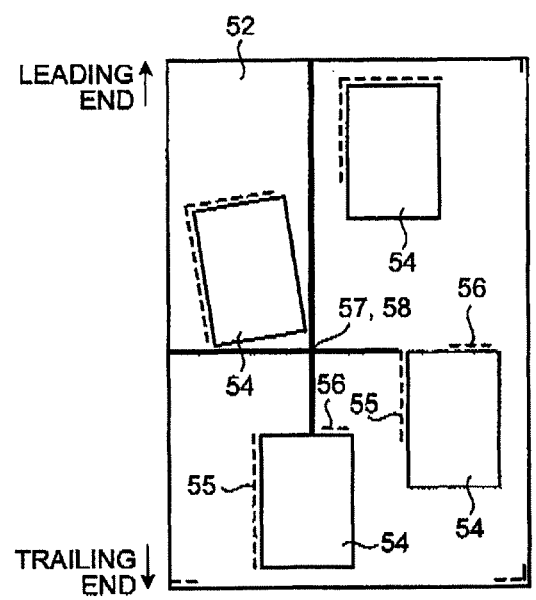

IMAGE-READING APPARATUS

CROSS-REFERENCE TO RELATED APPLICATION(S)

The present application claims priority to and incorporates by reference the entire contents of Japanese Patent Application No. 2014-094009 filed in Japan on Apr. 30, 2014.

BACKGROUND OF THE INVENTION

1. Field of the Invention

The present invention relates to an image-reading apparatus.

2. Description of the Related Art

Some image-reading apparatuses of recent years include a multi-crop scanning function that collectively reads respective images of a plurality of documents, which are a plurality of media to be read by the image-reading apparatus, to form overall image data, and forms independent individual image data for every documents from the overall image data (for example, Japanese Patent Application Laid-open No. 2009-100211).

When an image-reading apparatus, which is capable of multi-crop scanning, is what is called a flatbed scanner, when it is desired to acquire individual image data of a plurality of media in a desired order, it is necessary to lay the media according to a sequence of multi-crop scanning processing performed by the image-reading apparatus. However, it is difficult for a user to recognize the sequence of multi-crop scanning processing. Specifically, when media of different sizes are read, it is further difficult for the user to recognize the order of forming the image data of respective media in the multi-crop scanning processing. As in the foregoing, it has been very difficult to acquire the image data of a plurality of media in a desired order.

SUMMARY OF THE INVENTION

It is an object of the present invention to at least partially solve the problems in the conventional technology.

According to an aspect of the invention, an image-reading apparatus includes a housing having an insertion slot for inserting single medium or plural media, a conveying unit that conveys the single medium or plural media inserted from any position of the insertion slot in a width direction thereof to inside of the housing, an image capturing unit that captures an image of the single medium or plural media conveyed by the conveying unit, a control unit that controls at least the conveying unit and the image capturing unit, and an image processor configured to generate a captured image including single medium image or plural media image corresponding respectively to the single medium or plural media whose image has been captured by the image capturing unit, and clip a plurality of medium images that correspond respectively to media images in the plural media image off the captured image when the generated captured image includes the plural media image corresponding to the plural media in a direction along the width direction of the insertion slot. The image processor outputs the plurality of medium images clipped in an order of insertion of the plural media inserted into the insertion slot.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a flowchart illustrating a processing procedure in a method of detecting a plural documents based on a captured image;

FIG. 9 is a diagram explaining detection of edges in a captured image;

FIG. 10 is a diagram explaining an intersecting position of a left side edge and an upper side edge;

DETAILED DESCRIPTION OF THE PREFERRED EMBODIMENT

The present invention will now be described in detail with reference to the drawings. The embodiment below is not intended to limit the present invention. The components of the embodiment include what is replaceable and easily conceived by a skilled person or what is substantially identical.

Embodiment

Figure 1:
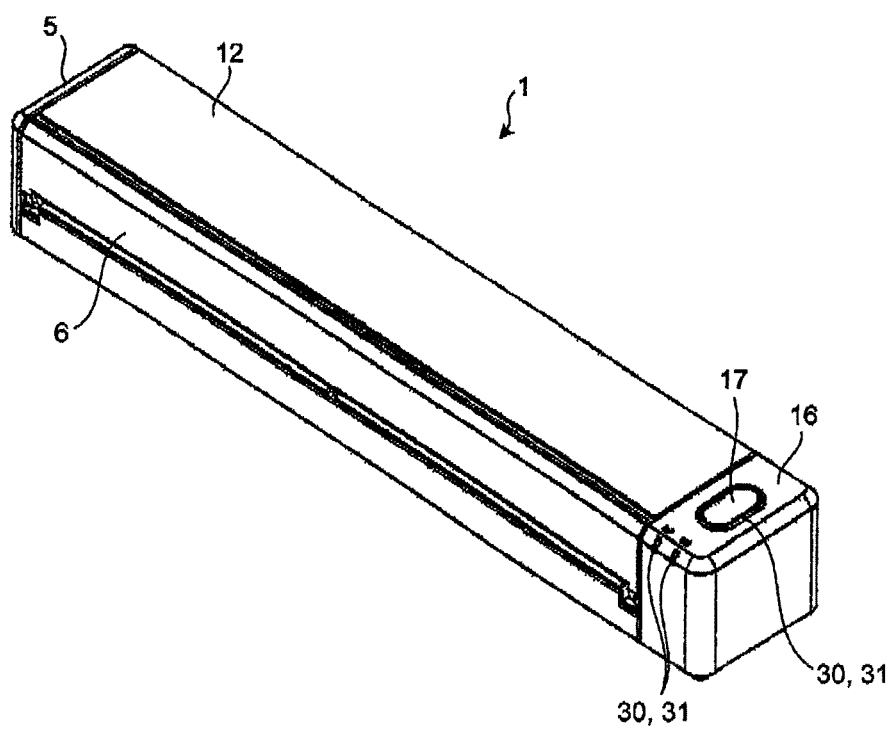
FIG. 1 is a perspective view of an image-reading apparatus according to an embodiment.
Figure 2:
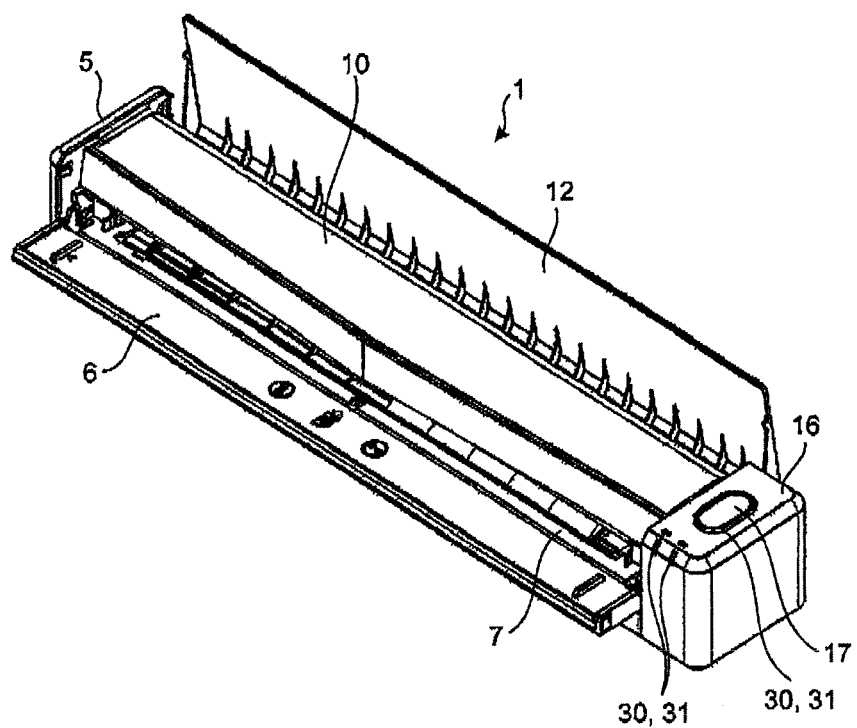
FIG. 2 is a perspective view illustrating the image-reading apparatus shown in FIG. 1 in a state being capable of reading a document.

FIG. 1 is a perspective view of the image-reading apparatus according to the embodiment. FIG. 2 is a perspective view illustrating the image-reading apparatus shown in FIG. 1 in a state being capable of reading a document. In the following description, with respect to an image-reading apparatus 1 of the embodiment, an upper side of the image-reading apparatus 1 in normal use is defined as the upper side, and a lower side of the image-reading apparatus 1 in the normal use is defined as the lower side. The image-reading apparatus 1 illustrated in FIGS. 1 and 2 includes a housing 5 that has an insertion slot 7 into which a document, i.e., a medium to be a reading target, is inserted, so that the image-reading apparatus 1 is capable of reading an image of the document inserted from the insertion slot 7. The housing 5 is formed in a substantially rectangular parallelepiped shape, and the image-reading apparatus 1 includes a platen 6 that is rotatably provided on one surface of the housing 5, and a rotating shaft of the platen 6 is arranged along the longitudinal direction of the rectangular parallelepiped. Accordingly, and by making the platen 6 into an opened state, the insertion slot 7 opens to outside.

In detail, the platen 6 is arranged on a side surface extending in the longitudinal direction, among directions of the image-reading apparatus 1 in use, of the rectangular parallelepiped, which is the shape of the housing 5. The platen 6 has a rotating shaft on the lower end side of the platen 6, and is rotatable about the rotating shaft. When the rotatable platen 6 is in a closed state, the platen 6 constitutes one surface of the rectangular parallelepiped that is the shape of the housing 5 (FIG. 1). Furthermore, when the platen 6 is in an opened state by turning the platen 6 about the rotating shaft, the platen 6 is arranged nearly orthogonal to the one surface of the rectangular parallelepiped on which the platen 6 is provided, and the platen 6 is in a nearly horizontal state (FIG. 2).

The insertion slot 7 is formed behind the platen 6 in the closed state, so that the insertion slot 7 is positioned inside the platen 6 in the closed state, and when the platen 6 is in an opened state, the insertion slot 7 is formed as an opening that opens the inside of the housing 5 to the outside. The insertion slot 7 is formed extending in the longitudinal direction of the rectangular parallelepiped that is the shape of the housing 5 in a length approximately the same as that of the platen 6 in the longitudinal direction. The platen 6 and the insertion slot 7 are provided in a positional relation in which the position of the upper surface of the platen 6 in an up-down direction when the platen 6 is opened is to be approximately the same as the position of the lower surface of the insertion slot 7.

On the lower surface side of the insertion slot 7, a document detection sensor 20, i.e., a medium detector for detecting a document being inserted from any position of the insertion slot 7 in the width direction thereof, is further arranged. That is, the document detection sensor 20 can detect that a document is being inserted into the insertion slot 7 from any position in the longitudinal direction of the housing 5.

The housing 5 is further provided with an ejection guide 12 that is a guide for the document when discharging the document inserted from the insertion slot 7. The ejection guide 12 is, similarly to the platen 6, formed to be rotatable about a rotating shaft of the ejection guide along the longitudinal direction of the housing 5. The rotating shaft of the ejection guide 12 is positioned on a side of a surface opposite to the surface on which the platen 6 is arranged. The ejection guide 12 is formed extending from the surface on which the rotating shaft thereof is positioned over to the upper surface of the housing 5. Thus, in a state of the ejection guide 12 being closed, the ejection guide 12 constitutes the upper surface of the housing 5 (FIG. 1), and in a state of the ejection guide 12 being opened, the ejection guide 12 is in a state of extending upward from the position of the rotating shaft of the ejection guide 12 (FIG. 2).

A ejection slot (illustration omitted) for the document inserted from the insertion slot 7 is provided on the surface side opposite to the surface side on which the insertion slot 7 is located, in other words, on the surface side on which the rotating shaft of the ejection guide 12 is provided, and the ejection slot is provided at a position higher than the rotating shaft of the ejection guide 12. Consequently, the document ejected from the ejection slot can be ejected along the surface of the ejection guide 12 that is positioned on the inner side of the housing 5 when the ejection guide 12 is closed.

On one end side in the longitudinal direction of the housing 5, in other words, on the one end side in the longitudinal direction of an area where the platen 6 and the ejection guide 12 are arranged, an operation unit 16 is provided. The operation unit 16 is a part of the image-reading apparatus 1 at which a user of the image-reading apparatus 1 performs operation. In the operation unit 16, a scan switch 17 and a lighting unit 31 are provided. The scan switch 17 constitutes an input unit that receives an instruction of scan operation from the user to make the image-reading apparatus 1 perform scanning operation. The lighting unit 31 constitutes a notifying unit 30 that notifies the user of a variety of information when the image-reading apparatus 1 is in operation. The lighting unit 31 can notify the user of the operating status of the image-reading apparatus 1 by varying a lighting status and the color thereof when lit.

Figure 3:
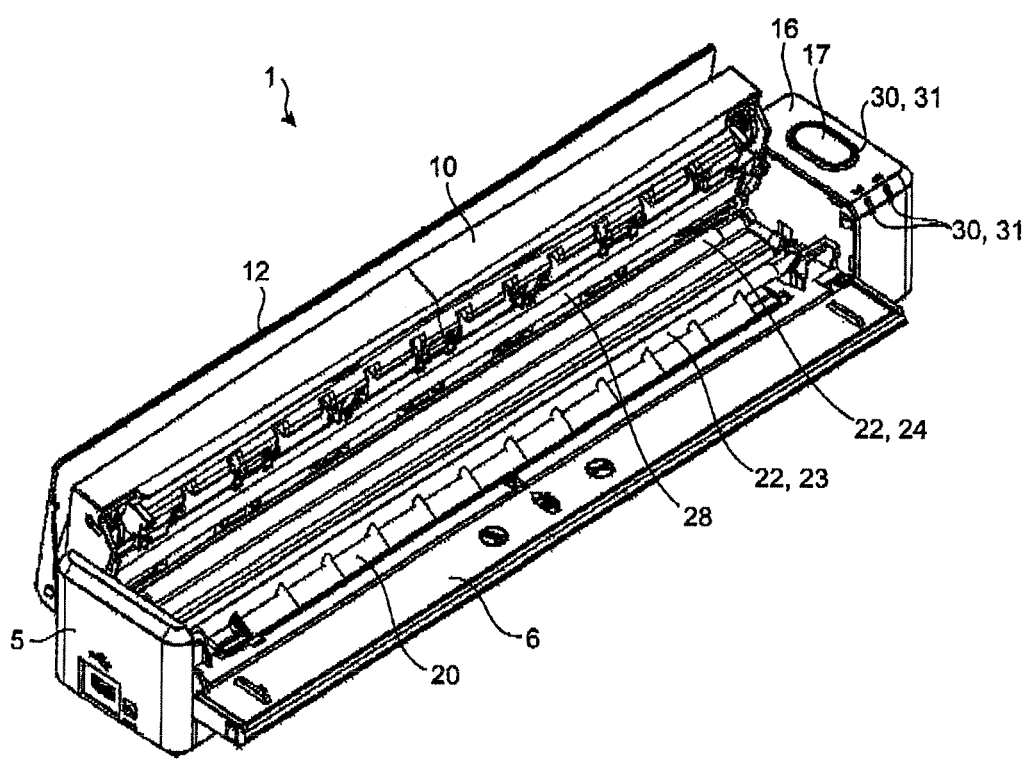
FIG. 3 is a perspective view illustrating an opening/closing cover depicted in FIG. 2 in a state being opened.

The image-reading apparatus 1 further includes an opening-closing cover 10 that opens or closes a conveying path on which the document inserted from the insertion slot 7 is conveyed to read an image. FIG. 3 is a perspective view illustrating the opening-closing cover depicted in FIG. 2 in an opened state. The opening-closing cover 10 has a rotating shaft along the longitudinal direction of the housing 5 on the surface side on which the ejection slot is located, and is rotatable about the rotating shaft. When the opening-closing cover 10 is opened, the conveying path for the document inserted from the insertion slot 7 is in a state of being exposed to the outside.

The document detection sensor 20 arranged on the lower surface side of the insertion slot 7 is arranged spanning over nearly an entire area of the width of the insertion slot 7 in the longitudinal direction of the housing 5, and is rotatable about a rotating shaft oriented along the longitudinal direction of the housing 5. The rotating shaft of the document detection sensor 20 is positioned on the end portion side of the document detection sensor 20 on the platen 6 side. The document detection sensor 20 is formed spanning over nearly the entire area of the insertion slot 7, and the document detection sensor 20 as a whole is rotatable about the rotating shaft. A biasing force in a rotational direction is exerted on the document detection sensor 20. This biasing force makes the document detection sensor 20 move in a direction upper than the rotating shaft in normal state. When the document is inserted into the insertion slot 7, the document contacts the document detection sensor 20 making the document detection sensor 20 turn downward, which enables the document detection sensor 20 to detect the document.

Furthermore, a document conveying unit 22 is arranged on the conveying path for documents. The document conveying unit 22 is a conveying unit for conveying a document inserted from any position of the insertion slot 7 in the width direction thereof, to the inside of the housing 5. The document conveying unit 22 is arranged, similarly to the document detection sensor 20, spanning over nearly the entire area of the width of the insertion slot 7 in the longitudinal direction of the housing 5, and is composed of rollers that rotate about rotating shafts oriented along the longitudinal direction of the housing 5. As for the rollers constituting the document conveying unit 22, an upstream-side conveying roller 23 arranged at a position closer to the insertion slot 7 and a downstream-side conveying roller 24 arranged at a position closer to the ejection slot are provided, and the document conveying unit 22 is composed of the upstream-side conveying roller 23 and the downstream-side conveying roller 24.

Moreover, on the upper surface side of the conveying path for the document, in other words, on the lower surface side of the opening-closing cover 10, an image-reading sensor 28 is provided. The image-reading sensor 28 is an image-capturing unit for capturing an image of the document conveyed by the document conveying unit 22. The image-reading sensor 28 is what is called a line sensor in which a plurality of image-capturing elements are linearly arranged in a single line, and in the image-reading apparatus 1 in the embodiment, the image-capturing elements are linearly arranged in a single line in the longitudinal direction of the housing 5. The image-reading sensor 28 formed as a line sensor is arranged spanning over nearly the entire area of the width of the insertion slot 7 in the longitudinal direction of the housing 5, and the direction of the image-capturing elements linearly arranged in a single line is a main-scanning direction of the image-reading sensor 28 that is the line sensor. The upstream-side conveying roller 23 of the document conveying unit 22 is positioned closer to the insertion slot 7 than the image-reading sensor 28, and the downstream-side conveying roller 24 is positioned closer to the ejection slot than the image-reading sensor 28.

Figure 4:
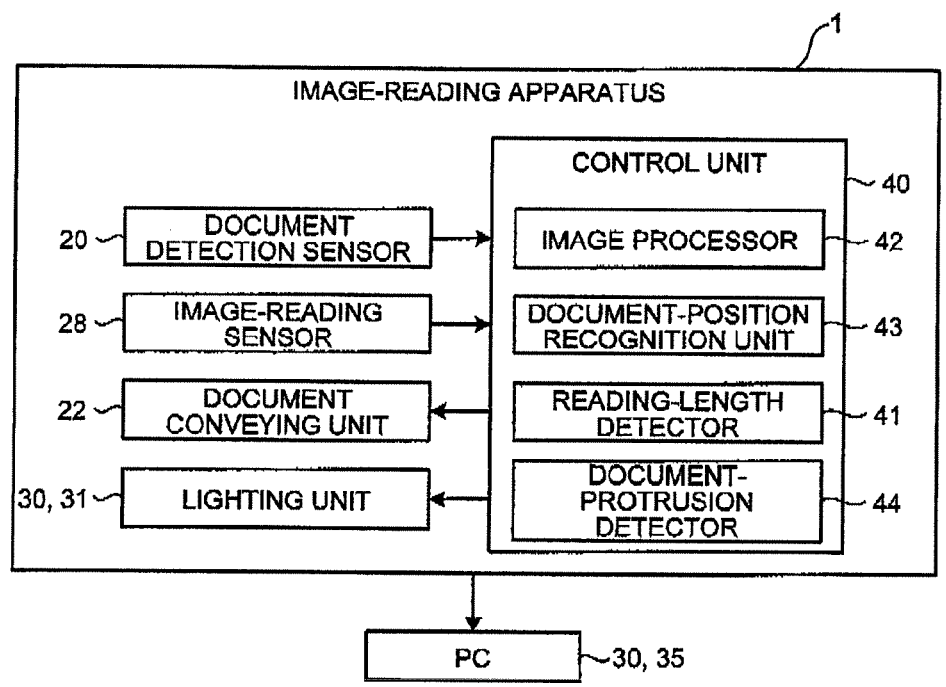
FIG. 4 is a functional block diagram of the image-reading apparatus illustrated in FIG. 1.

FIG. 4 is a functional block diagram of the image-reading apparatus illustrated in FIG. 1. The document detection sensor 20, the image-reading sensor 28, the document conveying unit 22, and the lighting unit 31 are connected to a control unit 40 that controls various units of the image-reading apparatus 1. The control unit 40 is composed of an electronic control device that transmits and receives various signals by means of electric signals and performs various arithmetic processing, thereby the control unit 40 can control individual components of the image-reading apparatus 1 such as the document conveying unit 22 and the image-reading sensor 28.

The control unit 40 includes an image processor 42 that performs processing of an image captured by the image-reading sensor 28, a document-position recognition unit 43 that is a media-quantity determining unit that determines whether the number of documents inserted into the insertion slot 7 is one or more than one, a reading-length detector 41 for detecting the reading length when reading an image of the document by the image-reading sensor 28, and a document-protrusion detector 44 for detecting whether the reading length when reading the image of the document is longer than a predetermined length. The image processor 42 out of the foregoing can generate a captured image including a document image, which is a medium image corresponding to the document captured by the image-reading sensor 28, and to clip the document image so as to output the document image. The document-protrusion detector 44 is provided as an abnormality determining unit that determines it to be abnormal when the conveyance of a document is performed longer than a predetermined length by the document conveying unit 22 while the document being inserted is detected by the document detection sensor 20.

Furthermore, the image-reading apparatus 1 is connected to an external processing device, and can output a document image read by the image-reading apparatus 1 to the external processing device. As for the external processing device, a personal computer (PC) 35 and a tablet device are used, for example. Here, a case in which the PC 35 is used as the external processing device is explained. The PC 35 is configured to acquire a document image read by the image-reading apparatus 1, and is provided also as a notifying unit 30 that notifies the user of a variety of information when the image-reading apparatus 1 is in operation. The PC 35 is configured to notify the user of an operating status of the image-reading apparatus 1 by appropriately displaying the information concerning the image-reading apparatus 1 on a display (not depicted) of the PC 35.

Figure 5:
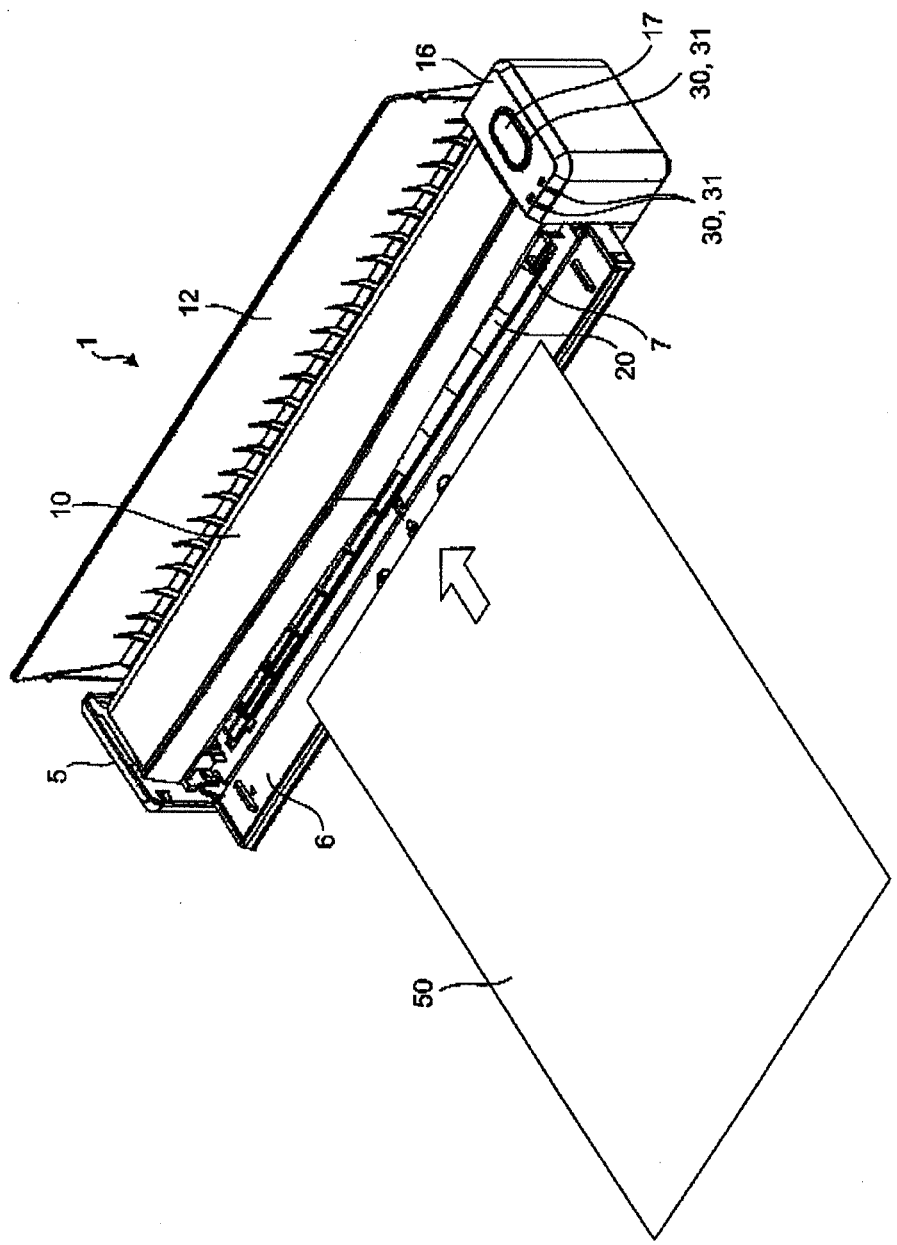
FIG. 5 is a diagram explaining a situation where an image of a document is read by the image-reading apparatus shown in FIG. 1.

The image-reading apparatus 1 in the embodiment constitutes in the foregoing, and in the following description, the operation thereof will be explained. FIG. 5 is a diagram for explaining a situation of reading an image of a document by the image-reading apparatus illustrated in FIG. 1. When reading an image of the document by the image-reading apparatus 1, while the platen 6 and the ejection guide 12 are both in the opened state, the user inserts the document 50, i.e., the medium, into the insertion slot 7 along the platen 6, and under this condition, depresses the scan switch 17 of the operation unit 16. This makes the image-reading apparatus 1 activate the document conveying unit 22 to convey the document 50 inside the housing 5, and while the document 50 is conveyed from the insertion slot 7 side to the ejection slot side, read the image of the document 50 by the image-reading sensor 28 arranged between the insertion slot 7 and the ejection slot. The document 50 whose image has been read is ejected from the ejection slot, and is ejected upward along the ejection guide 12.

The image read by the image-reading sensor 28 is processed such that, the image processor 42 clips a document image, which is an image corresponding to the document 50, off a captured image, which is an image of an entire image-capturing area generated based on an electric signal when the image has been captured by the image-reading sensor 28, and outputs the document image to the PC 35. The PC 35 stores therein the document image transmitted from the image-reading apparatus 1, and displays the document image to inform the user of the document image being read. Furthermore, when the image-reading apparatus 1 reads the image, the image-reading apparatus 1 notifies the user that reading of image is under way by lighting up the lighting unit 31 of the operation unit 16 and/or displaying on the display of the PC 35 that the image-reading apparatus 1 is in reading operation.

Figure 6:
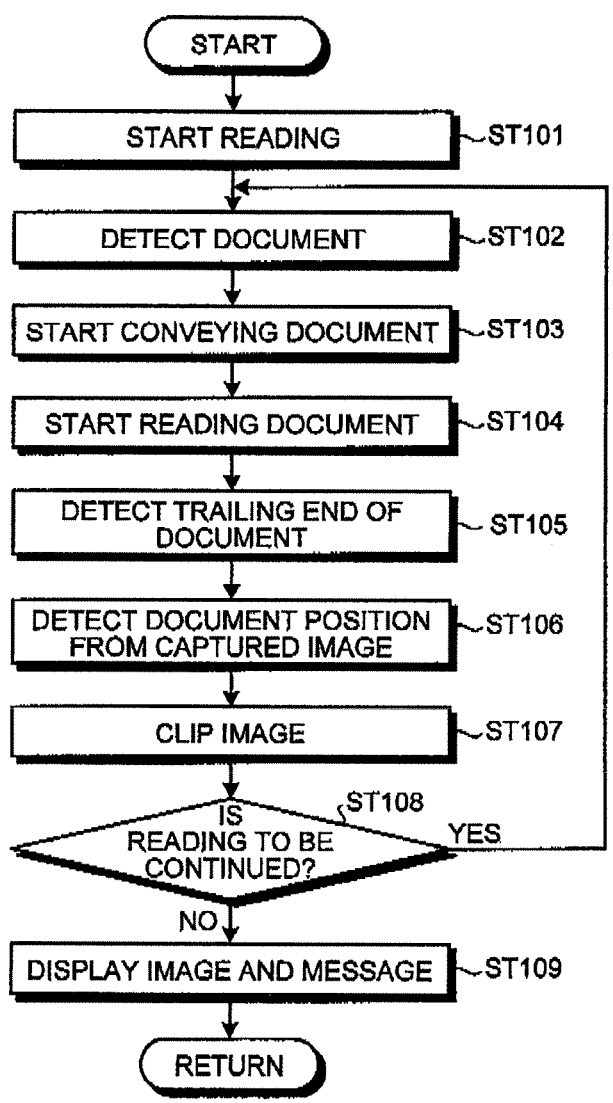
FIG. 6 is a flowchart illustrating a processing procedure of reading the image of the document by the image-reading apparatus shown in FIG. 1.

Next, a processing procedure when an image of the document 50 is read by the image-reading apparatus 1 is explained. FIG. 6 is a flowchart illustrating a processing procedure when reading the image of the document by the image-reading apparatus shown in FIG. 1. The reading of the document 50 by the image-reading apparatus 1 is started by depressing the scan switch 17 (Step ST101). At the start of reading, the document 50 is first detected by the document detection sensor 20 (Step ST102). That is, when the document 50 is inserted into the insertion slot 7, the document 50 contacts the document detection sensor 20 that is formed spanning almost entire area of the insertion slot 7 in the width direction, and thus the document detection sensor 20 is turned or rotated downward. The document detection sensor 20 detects the presence or absence of the document 50 to read, based on whether the document detection sensor 20 is turned downward or not.

When the document detection sensor 20 detects the document 50 being inserted to the insertion slot 7 by turning or rotation of the document detection sensor 20, the conveyance of the document 50 is started by activating the document conveying unit 22 (Step ST103). The document conveying unit 22 conveys the document 50 from the insertion slot 7 side to the ejection slot side by contacting the document 50 while rotating.

Next, the image-reading apparatus 1 starts reading image of the document (Step ST104). That is, by activating the image-reading sensor 28, the image-reading apparatus 1 performs reading of an image of an entire reading area including the document 50, which is conveyed by the document conveying unit 22, by the image-reading sensor 28 when the document 50 is conveyed. As in the foregoing, when the image-reading apparatus 1 performs reading of the image of the document 50, the image-reading apparatus 1 reads the image and detects trailing end of the document while the document 50 is conveyed (Step ST105). The detection of the trailing end of the document 50 is performed based on whether the document 50 has been detected by the document detection sensor 20.

That is, as the document 50 is conveyed, when the trailing end of the document 50 in the conveying direction moves to the side on which the image-reading sensor 28 and the ejection slot are located from the side on which the document detection sensor 20 is located, the document 50 no longer contacts the document detection sensor 20. Consequently, by the biasing force exerted on the document detection sensor 20, the document detection sensor 20 turns or rotates in a direction toward a position upper than the rotational shaft of the document detection sensor 20. When the document detection sensor 20 is positioned in this posture, the document detection sensor 20 determines that the document 50 is not present over the document detection sensor 20, and thus determines that the document 50 has passed, in other words, detects the trailing end of the document 50 in the conveying direction.

Next, position of the document 50 is detected from the captured image (Step ST106). In other words, based on the captured image generated from the electric signal at the time the image has been captured by the image-reading sensor 28, edges in the captured image are detected by the document-position recognition unit 43, and based on the edges, the position of the image of the document 50 in the captured image is detected. When the position of the image of the document 50 is detected, the image is clipped (Step ST107). That is, the document image in the captured image detected by the document-position recognition unit 43 is clipped off the captured image by the image processor 42.

Next, the image-reading apparatus 1 determines whether to continue the reading (Step ST108). This determination is made by interpreting the intention of the user based on the input operation to the scan switch 17, for example. For example, when the input operation to the scan switch 17 represents that the reading is to be continued, the image-reading apparatus 1 determines to continue the reading (Yes at Step ST108), and the process returns to the Step ST 102 where the detection of the document 50 by the document detection sensor 20 is performed.

In contrast, when the input operation to the scan switch 17 represents that the reading is to be finished, the image-reading apparatus 1 determines not to continue the reading (No at Step ST108), and displays the image and a message (Step ST109). That is, the document image clipped by the image processor 42 is output to the PC 35, and the image of the document 50 is displayed on the display of the PC 35. Furthermore, the image-reading apparatus 1 notifies the user of completion of the reading by displaying that the reading of the document 50 has been completed on the display of the PC 35 and on the lighting unit 31 of the image-reading apparatus 1.

Figure 7:
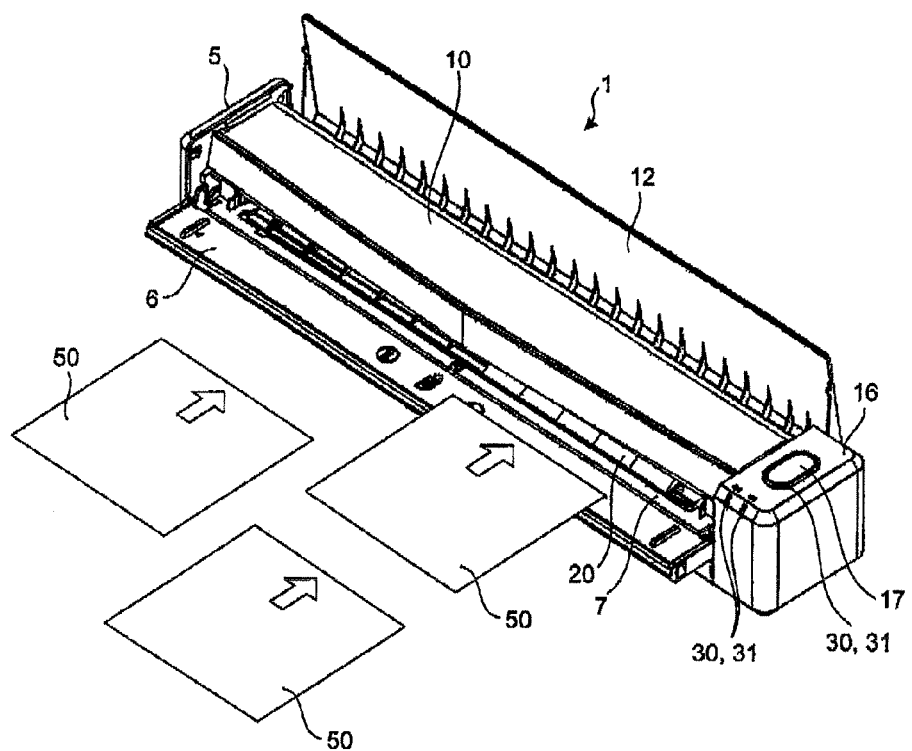
FIG. 7 is a diagram for explaining a situation where images of respective documents are read by the image-reading apparatus shown in FIG. 1.

Thus, the image-reading apparatus 1 that reads the image of the document 50 can continuously read the images of a plurality of documents 50 as necessary. FIG. 7 is a diagram for explaining a case in which the image-reading apparatus 1 shown in FIG. 1 reads images of a plurality of documents. By inserting a plurality of documents 50 into the insertion slot 7 when reading the images of the plurality of documents 50, the image-reading apparatus 1 can read the images of the respective documents 50. At that time, the image-reading apparatus 1 can read the images of the respective documents 50 even when the plural documents 50 are inserted at any position of the insertion slot 7 in the width direction thereof.

The following describes the method of reading an image of each document 50 when a plural documents 50 are inserted. When the plural documents 50 are inserted into the insertion slot 7, the image-reading apparatus 1 continuously captures images by the image-reading sensor 28 while conveying the plural documents 50 by the document conveying unit 22. The image processor 42 generates, based on the electric signal from the image-reading sensor 28 that continuously captures the images of the plural documents 50 in this manner, a captured image of the entire image-capturing range by the image-reading sensor 28.

The image processor 42 that generated the captured image in this manner clips a document image off the captured image for each of the document images corresponding to the respective documents 50. That is, when the captured image includes a plurality of document images in the direction corresponding to the width direction of the insertion slot 7, the image processor 42 clips a document image for each of the document images off the captured image. When the document images are clipped for the respective document images, the image processor 42 outputs the document images in the order of insertion of the plural documents 50 inserted into the insertion slot 7. That is, the image processor 42 outputs a plurality of document images corresponding to the respective documents 50 to the PC 35 in the order of the plural documents 50 inserted into the insertion slot 7.

When the captured image includes a plurality of document images, the image-reading apparatus 1 clips the document images for the respective document images. The following describes the method of detecting a plurality of document images. FIG. 8 is a flowchart illustrating a processing procedure for the method of detecting a plural documents based on a captured image. FIG. 9 is a diagram for explaining the detection of edges in a captured image. When detecting a plurality of document images 54 in a captured image 52, left edges and upper edges included in the captured image 52 are detected first (Step ST201). That is, when the leading end side of the document 50 in conveyance is defined as up, and the left side of the document 50, for which the leading end side thereof in the conveyance is defined as up, is defined as left, left side edges 55 are detected by detecting the variations in pixels in the captured image 52 from the left side toward the right side. In other words, the portions in which the lightness of pixels is drastically increased are detected as the left side edges 55. In the same manner, the variations in pixels in the captured image 52 are detected from the upper side toward the lower side, and the portions in which the lightness of pixels is drastically increased are detected as upper side edges 56.

Thus, the left side edges 55 and the upper side edges 56 here do not cover all the edges on the left side and all the edges on the right side of the respective document images 54. That is, because the left side edges 55 represent only the portions in which the lightness of pixels is drastically increased first when the captured image 52 is checked for the variations in pixels from the left side toward the right side, the edges positioned further right side to the detected left side edges 55 are not detected. Likewise, because the upper side edges 56 represent only the portions in which the lightness of pixels is drastically increased first when the captured image 52 is checked for the variations in pixels from the upper side toward the lower side, the edges positioned lower than the detected upper side edges 56 are not detected. When the captured image 52 includes a plurality of document images 54, detecting the left side edges 55 and the upper side edges 56 in this manner detects both the left side edges 55 and the upper side edges 56 as a plurality of segmented edges.

Next, intersection points of left edge positions and upper edge positions are detected (Step ST202). That is, intersection points 57 of the left side edges 55 and the upper side edges 56 are detected. At that time, because the left side edges 55 and the upper side edges 56 are not detected at the portions overlapping in the left-right direction and in the up-down direction in the captured image 52, the left side edges 55 and the upper side edges 56 include those appropriately corresponding to the edges of the document images 54 and those constituting a part of the edges of the document images 54. Out of the foregoing, because the left side edge 55 and the upper side edge 56 appropriately corresponding to the edges of the document image 54 intersect with each other, an intersecting portion forms the intersection point 57.

In contrast, with those constituting a part of the edges of the document image 54 out of the left side edges 55 and the upper side edges 56, the left side edge 55 and the upper side edge 56 do not intersect with each other directly. In this case, an intersecting position on a position of the end portion of the edge in the up-down direction and on a position of the end portion of the edge in the left-right direction is detected as the intersection point 57.

FIG. 10 is a diagram for explaining an intersecting position of a left side edge and an upper side edge. When detecting an intersecting position as the intersection point 57, for the left side edge 55, detection of the intersecting position is performed in the leftward direction from the position of the upper end portion of the left side edge 55 in the up-down direction. For the upper side edge 56, the detection of the intersecting position is performed in the upward direction from the position of the left end portion of the upper side edge 56 in the left-right direction. The detection of intersecting position is thus performed, and intersecting position of both the detections in the foregoing manner is detected as the intersection point 57.

Next, a point that includes all the edges present further left and up than the intersection point 57 is obtained (Step ST203). That is, obtained is a point 58, by being located further in the right direction and in the downward direction than all the portion of the left side edges 55 and all the portion of the upper side edges 56 located at the upper left, which includes all of the left side edges 55 and the upper side edges 56 when viewed in the upper left direction therefrom. For example, as illustrated in FIG. 10, the intersection point 57, which includes all of the left side edges 55 and the upper side edges 56 located at the upper left, is obtained as the point 58 that includes all of the edges present further left and up than the intersection point 57.

Figure 11:
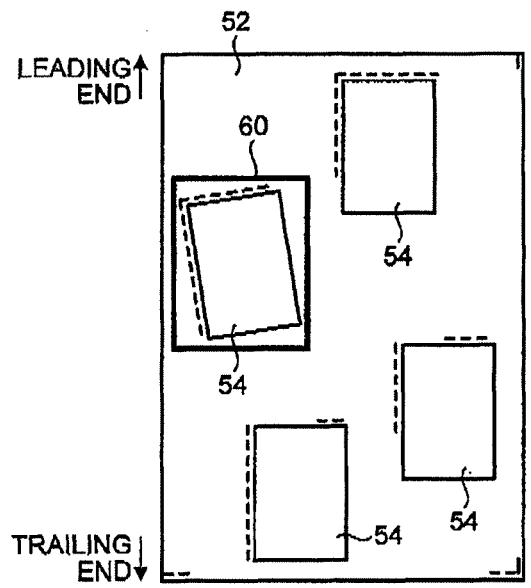
FIG. 11 is a diagram explaining a rectangle defined by detected edges located at the upper left.

Next, a rectangle area is set as a detecting position (Step ST204). FIG. 11 is a diagram for explaining a rectangle area set by detecting edges that locate at the upper left. That is, a rectangle area 60 that includes all of the left side edges 55 and the upper side edges 56 located at the upper left is set. This detects the first one of the document images 54 in the captured image 52. Then, on the right side of the detected rectangle area, edges are detected from the left side, and on the lower side of the detected rectangle area, edges are detected from the upper side (Step ST205). In other words, to detect the second and subsequent document images 54, edges are detected in the captured image 52 excluding the already-detected rectangle area 60.

Figure 12:
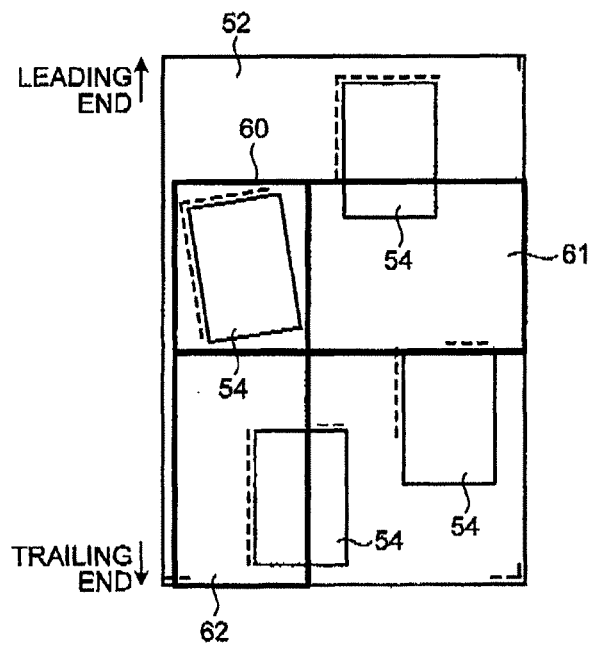
FIG. 12 is a diagram explaining a situation of detecting the edges on the right side and on the lower side of the rectangle.
Figure 13:
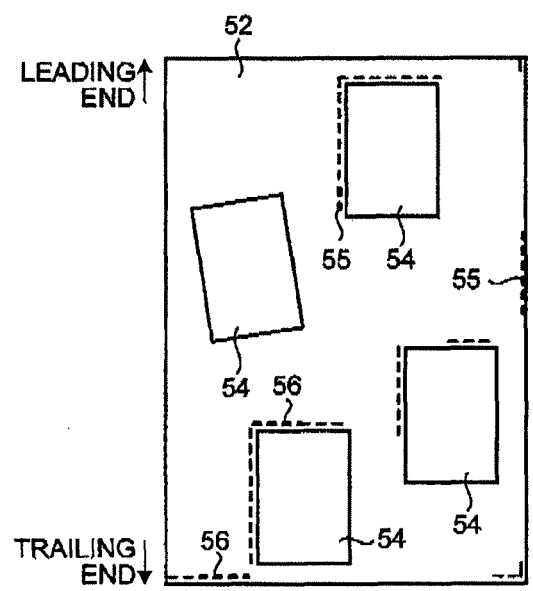
FIG. 13 is an explanatory diagram illustrating newly detected edges.

FIG. 12 is a diagram for explaining a situation of detecting edges on the right side and on the lower side of the rectangle area. FIG. 13 is an explanatory diagram illustrating newly detected edges. The following describes the method of detecting edges on the right side and the lower side of the rectangle area 60. When detecting the edges on the right side of the rectangle area 60 first, the variations in pixels are detected from the left side toward the right side within a right side area 61 that is an area located on the right side of the rectangle area 60 in the captured image 52 with the same length as that of the rectangle area 60. This detects the edges within the right side area 61, and the new left side edges 55 are detected. In the same manner, when detecting the edges on the lower side of the rectangle area 60, the variations in pixels are detected from the upper side toward the lower side within a lower side area 62 that is an area located on the lower side in the captured image 52 with the same width as that of the rectangle area 60. This detects the edges within the lower side area 62, and the new upper side edges 56 are detected.

Next, only the coordinates of detected edges are updated (Step ST206). That is, when the actual edges are detected by detecting edges over the right side and the lower side of the rectangle area, only the coordinates of the detected edges are updated and the edges of the actual document images 54 are acquired. Next, an intersection point of the left edge position and the upper edge position is detected (Step ST207). In other words, the intersection point 57 that includes the updated left side edge 55 or the upper side edge 56 is detected.

Figure 14:
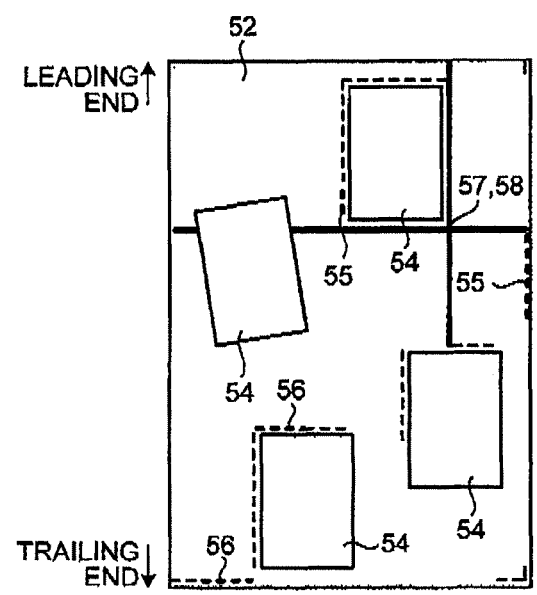
FIG. 14 is a diagram explaining an intersecting position of the new left side edge and upper side edge.

FIG. 14 is a diagram for explaining an intersecting position of the new left side edge and upper side edge. When detecting the intersection point 57 that includes the updated left side edge 55 or the upper side edge 56, with respect to the left side edge 55, the detection of the intersecting position is performed in the leftward direction from the position of the upper end portion of the left side edge 55, and with respect to the upper side edge 56, the detection of the intersecting position is performed in the upward direction from the left end portion of the upper side edge 56 as with the foregoing. The intersecting position of the both, when the detection of the intersecting position is performed in the foregoing manner, is detected as the intersection point 57.

Next, it is determined whether the control unit 40 has failed to detect an intersection point of the left edge position and the upper edge position (Step ST208). That is, it is determined whether the control unit 40 has failed to detect the new intersection point 57 that includes the newly detected left side edge 55 or the upper side edge 56. By this determination, when the new intersection point 57 has been successfully detected (No at Step ST208), the processing is repeated by returning to the procedure (Step ST203) to obtain the point that includes all of the edges present at the upper left than the intersection point 57. In this case, the new intersection point 57 is used as the new point 58 that includes all the edges present at the upper left than the new intersection point 57. In contrast, when the new intersection point 57 has not been successfully detected (Yes at Step ST208), the processing exits from the processing procedure. That is, until the rectangle area 60 is no longer detectable or the new edges are no longer available, the procedure from Step ST203 to Step ST208 is repeated. Each of the document images 54 is properly clipped, based on the edges and the rectangle areas 60 detected in the foregoing manner, from the captured image 52 using existing methods and the like at the time of cropping, as appropriate.

As in the foregoing, when reading an image of the document 50, the image-reading apparatus 1 captures the image of the document 50 by the image-reading sensor 28 while the document 50 is conveyed by the document conveying unit 22.

However, when the image is being read, the document-protrusion detector 44 determines whether the conveyance of the document 50 is performed longer than a predetermined length.

Figure 15:
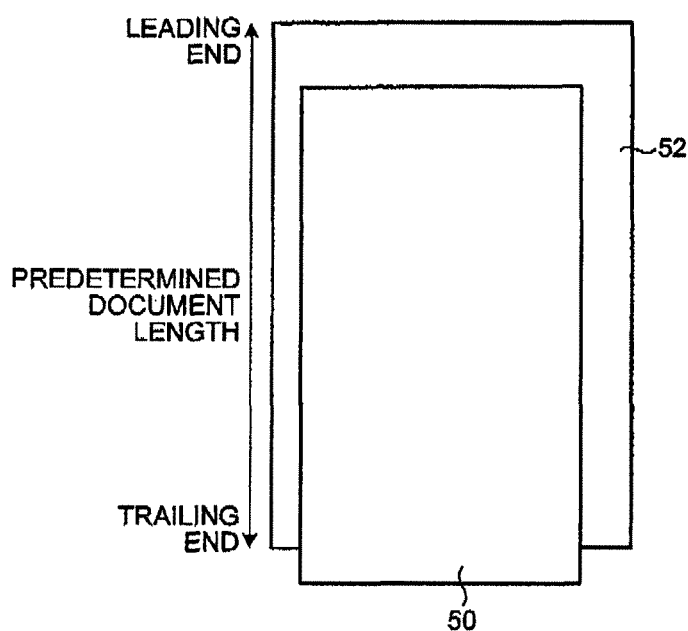
FIG. 15 is an explanatory diagram of a state in which the length of a document exceeds a predetermined document length.

FIG. 15 is an explanatory diagram illustrating a state in which length of the document exceeds a predetermined document length. A predetermined length used for determining whether the conveyance of the document 50 is performed longer than the predetermined length is predetermined as the predetermined document length by the document-protrusion detector 44, and the predetermined length is stored in a storage unit (not illustrated) of the control unit 40.

With respect to the predetermined document length, in a case of, for example, generating the captured image 52 at the image processor 42, when the data capacity for a single captured image 52 is limited, a length of data of the captured image 52 which exceeds the capacity is defined as the predetermined document length. At the time of reading an image of the document 50, the document-protrusion detector 44 compares the amount of data of the single captured image 52 generated by the image processor 42 with a limiting value of the data capacity, and when the amount of data of the captured image 52 is greater than the limiting value of the data capacity, determines that the length of the document 50 is longer than the predetermined document length.

Specifically, at the time of reading the document 50, the image processor 42 generates the captured image 52 by capturing the image of the document 50 with the image-reading sensor 28 while the document 50 is conveyed by the document conveying unit 22, and the reading-length detector 41 detects the document length of the captured image 52. In other words, the reading-length detector 41 detects the document length that is the length of the captured image 52 in the conveying direction, based on the amount of data of the captured image 52 which is stored successively. The document-protrusion detector 44 compares the document length detected successively by the reading-length detector 41 with the predetermined document length defined in advance, and when the document length detected by the reading-length detector 41 is longer than the predetermined document length, determines that the length of the document 50 conveyed is longer than the predetermined document length.

When the document-protrusion detector 44 determines that the length of the document 50 conveyed is longer than the predetermined document length and thus is abnormal, abnormality of the document length is notified outside by the notifying unit 30. For example, by lighting up the lighting unit 31 in a lighting-up mode to notify the abnormality and by displaying that something is wrong with the conveyance of the document 50 on the display of the PC 35, the user is notified of the abnormality in the conveyance of the document 50. Therefore, the user can recognize that abnormality occurred in reading the document 50, for example, when a paper jam occurs while reading the document 50, and the capturing of image by the image-reading sensor 28 and the conveyance of the document 50 by the document conveying unit 22 are being continued without progressing the conveyance of the document 50.

Furthermore, when the document-protrusion detector 44 determines that abnormality occurred while reading a single piece of the document 50, i.e., a single document, the document image 54 corresponding to the read document 50 cannot be generated from the captured image 52. For this reason, the notifying unit 30 also notifies the user that the document 50 has been unable to be read.

Figure 16:
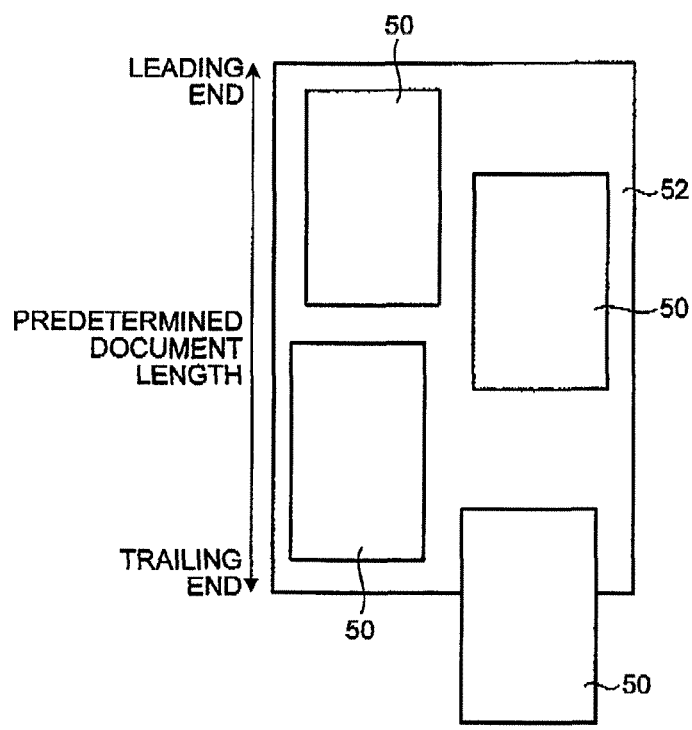
FIG. 16 is an explanatory diagram of a state in which the length of a document among the plural documents exceeds the predetermined document length when the plural documents are read.

FIG. 16 is an explanatory diagram illustrating a state in which the predetermined document length is exceeded when plural documents are read. While the images of the plural documents 50 can be read continuously, in this case, the images of the plural documents 50 are generated as a single captured image 52, and then the document images 54 corresponding to respective ones of the plural documents 50 are clipped off the captured image 52. Thus, when the number of the plural documents 50 to read is large, the total length of the plural documents 50 in the conveying direction thereof may be longer than the predetermined document length. At the time of reading the plural documents 50 as in the foregoing, the document-protrusion detector 44 also determines it to be abnormal when the total length of the plural documents 50 is longer than the predetermined document length. In this case, the notifying unit 30 such as the lighting unit 31 and the PC 35 also notifies the user of the abnormality in reading the plural documents 50.

Even when the document-protrusion detector 44 determines that abnormality occurred while reading the plural documents 50, some documents 50 that stay within the range of the predetermined document length, among the plural documents 50, are in a state in which the images thereof have been able to be read properly. That is, when the abnormality occurs while reading the plural documents 50, only remainder document(s) 50 that fail to stay within the range of the predetermined document length, among the plural documents 50, are in a state in which the images thereof have not been able to be read properly.

When abnormality occurs while reading the document(s) 50, the situation in which the document image 54 can be acquired differs depending on when the single document 50 is read and when the plural documents 50 are read. Thus, when it is determined that abnormality occurred while reading the document(s) 50, it is determined whether the single document 50 is read or the plural documents 50 are read, i.e., the number of documents 50 is one or more than one. This determination is made by the document-position recognition unit 43, and the document-position recognition unit 43 determines whether the single document 50 is inserted or the plural documents 50 are inserted, into the insertion slot 7, based on the captured image 52 generated by the image processor 42. In other words, the document-position recognition unit 43 determines that the number of documents 50 inserted into the insertion slot 7 is one, or the single document 50 is inserted into the insertion slot 7, when a single document image 54 is in the captured image 52, and when a plurality of document images 54 are in the captured image 52, determines that the number of documents 50 is more than one, or plural, i.e., the plural documents 50 are inserted.

In a situation in which abnormality occurred while reading the document(s) 50, when the document-position recognition unit 43 determines that the number of documents 50 inserted into the insertion slot 7 is one, i.e., the single document 50 is inserted into the insertion slot 7, the notifying unit 30 notifies the user that the document image 54 corresponding to the document 50 inserted into the insertion slot 7 has not been able to be generated. On the other hand, in a situation in which abnormality occurred while reading the document(s) 50, when the document-position recognition unit 43 determines that the number of documents 50 inserted into the insertion slot 7 is plural, i.e., the plural documents 50 are inserted into the insertion slot 7, the notifying unit 30 notifies the user that the document image 54 corresponding to a lastly inserted document 50, among the plural documents 50 inserted into the insertion slot 7, has not been able to be generated.

Figure 17:
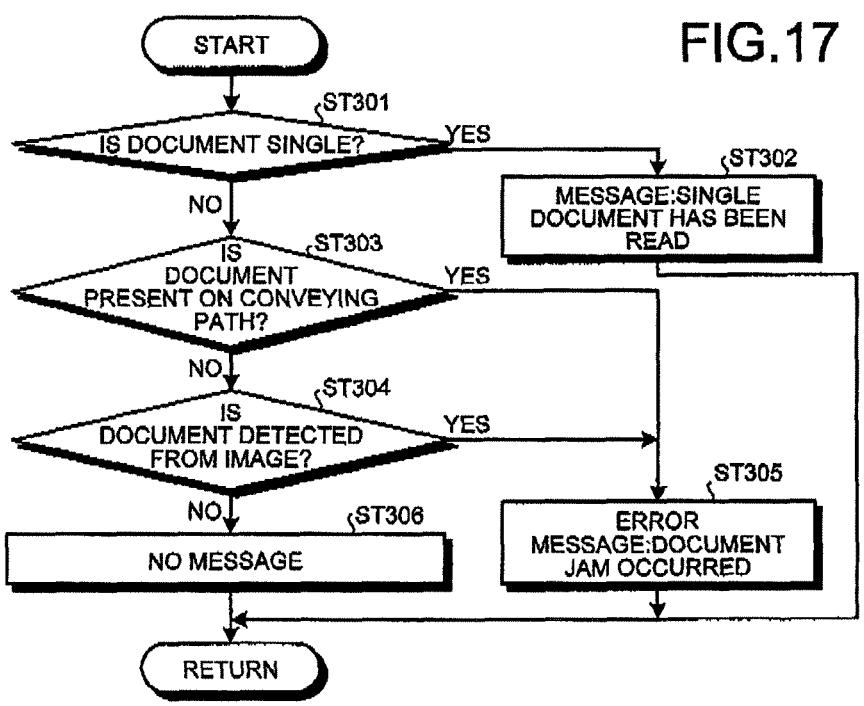
FIG. 17 is a flowchart illustrating a procedure of notification when a single document is read.

Next, the following describes a procedure for the notifying unit 30 to notify when the document(s) 50 is read in the foregoing manner. FIG. 17 is a flowchart illustrating a procedure for notification when a single document is read. When the document 50 has been read, it is determined first whether the single document 50 has been properly read (Step ST301). That is, the document-protrusion detector 44 determines whether the document length at the time of reading the document 50 is longer than the predetermined document length, and the document-position recognition unit 43 determines whether the captured image 52 includes the one or single document images 54 therein.

By this determination, when a single document 50 has been properly read (Yes at Step ST301), a message of "single document has been read" is notified (Step ST302). In other words, when it is determined that the document length of the document 50 at the time of reading is not longer than the predetermined document length and the number of document images 54 in the captured image 52 is one, the notifying unit 30 notifies the user that a single document 50 has been read.

In contrast, when a single document 50 has not been read properly (No at Step ST301), it is determined whether the document 50 is present on the conveying path (Step ST303). In other words, the presence or absence of the document 50 on the conveying path is determined based on whether the document detection sensor 20 is detecting the document 50.

By this determination, when the document 50 is not present on the conveying path (No at Step ST303), it is determined whether the document 50 has been detected from the image (Step ST304). In other words, the presence or absence of the document image 54, in the captured image 52 generated by the image processor 42, is determined.

When the document 50 has been detected from the image (Yes at Step ST304) or the document 50 is present on the conveying path (Yes at Step ST303), an error message of "document jam occurred" indicating jam of the document 50 is notified (Step ST305). That is, when the document 50 is determined to be present on the conveying path based on the document detection sensor 20 and the captured image 52, it is determined that the document 50 has caused jam in the conveying path, and that the "document jam occurred" indicating jam of the document 50 is notified by the lighting unit 31 or the PC 35.

In contrast, when the document 50 is not detected from the image (No at Step ST304), no message is notified by the notifying unit 30 (Step ST306). That is, when the image of the document 50 is not read (No at Step ST301) and the document 50 is not detected on the conveying path (No at Step ST303) (No at Step ST304), it can be determined that the reading operation of the document 50 is not performed, and in this case, no message is notified.

Figure 18:
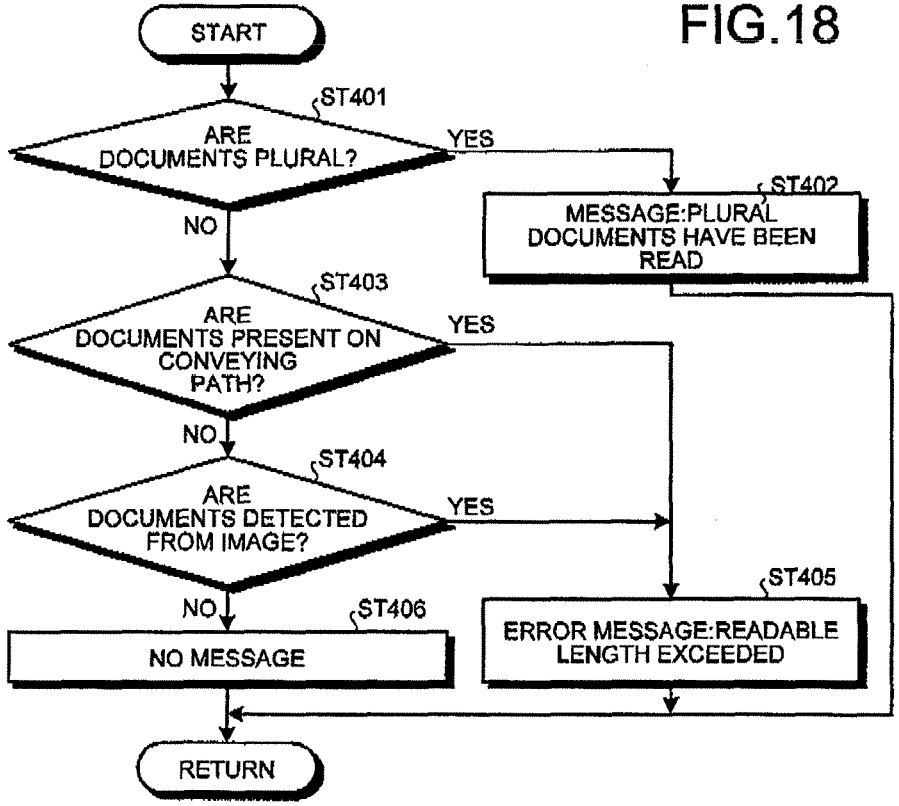
FIG. 18 is a flowchart illustrating a procedure of the notification when the plural documents are read.

FIG. 18 is a flowchart illustrating a procedure for the notification when the plural documents are read. When reading the plural documents 50, it is also determined first whether the plural documents 50 were properly read (Step ST401). That is, the document-protrusion detector 44 determines whether the total document length at the time of reading the plural documents 50 is longer than the predetermined document length, and the document-position recognition unit 43 determines whether the number of document images 54 in the captured image 52 is more than one, i.e., whether the captured image 52 includes the plural documents image.

By this determination, when the plural documents 50 were properly read (Yes at Step ST401), a message of "plural documents have been read" is notified (Step ST402). In other words, when it is determined that the total document length of the plural documents 50 at the time of reading is not longer than the predetermined document length and the number of document images 54 in the captured image 52 is more than one, the notifying unit 30 notifies the user that a plural documents 50 have been read.

In contrast, when the plural documents 50 have not been read properly (No at Step ST401), it is determined whether the plural documents 50 are present or absent on the conveying path (Step ST403). That is, the presence or absence of the plural documents 50 on the conveying path is determined based on whether the document detection sensor 20 is detecting the plural documents 50.

By this determination, when the plural documents 50 are not present on the conveying path (No at Step ST403), it is determined whether the plural documents 50 have been detected from the image (Step ST404). In other words, the presence or absence of the document images 54 in the captured image 52 generated by the image processor 42 is determined.

When the plural documents 50 have been detected from the image (Yes at Step ST404) or the plural documents 50 are present on the conveying path (Yes at Step ST403), an error message of "readable length exceeded" indicating that the readable length has been exceeded is notified (Step ST405). That is, when the plural documents 50 are determined to be present on the conveying path based on the document detection sensor 20 and the captured image 52, the total length of the plural documents 50 is determined to be longer than the predetermined document length, and that the readable length at the time of reading the plural documents 50 has been exceeded is notified by the lighting unit 31 or the PC 35.

In contrast, when the plural documents 50 are not detected from the image (No at Step ST404), no message is notified by the notifying unit 30 (Step ST406). That is, when the images of the plural documents 50 are not read (No at Step ST401) and the plural documents 50 are not detected on the conveying path (No at Step ST403) (No at Step ST404), it is possible to determine that the reading operation of the plural documents 50 is not performed, and thus no message is notified in this case.

When a plurality of document images 54 are included in the captured image 52, which is captured by the image-reading sensor 28 and generated by the image processor 42, at the time of reading the plural documents 50, the image-reading apparatus 1 in the foregoing embodiment clips the plurality of document images 54 for every document images 54 and outputs the document images 54 in the order of the plural documents 50 inserted into the insertion slot 7. This enables the user, by inserting a plural documents 50 into the insertion slot 7 in the desired order of the images of the plural documents 50, to obtain the images of the plural documents 50 in the order of insertion. Consequently, the images of the plural documents 50 can be obtained in the desired order easily.

Furthermore, when the document-protrusion detector 44 determines that the document length is longer than the predetermined document length, in other words, the conveyance of the document(s) 50 has been performed longer than a predetermined length, it is determined whether the number of documents 50 inserted into the insertion slot 7 is one or more than one based on the captured image 52, and thus the cause of the conveyance of the document(s) 50 being longer than the predetermined length can be determined. This makes it possible to perform different kinds of operations at the time when the conveyance of the document 50 is longer than the predetermined length, depending on the number of documents 50 inserted into the insertion slot 7. Consequently, when an error occurs while a plural documents 50 are readable, the processing can be performed appropriately depending on the number of documents 50 to read being one or more than one, i.e., depending on whether the single document 50 is read or the plural documents are read.

When the document(s) 50 is determined to be conveyed longer than the predetermined length and the number of documents 50 inserted into the insertion slot 7 is determined to be more than one, the notifying unit 30 notifies the user that the document image 54 corresponding to the document 50 last inserted into the insertion slot 7 has not been generated. Thus, the user can perform the re-reading of only the document 50 for which the document image 54 has not been generated. Consequently, the convenience in reading the plural documents 50 can be improved.

Modifications

The reading rate at the time of reading the document 50 may be made variable. For example, when reading a plural documents 50, the reading rate may be made slower to facilitate manual insertion of the plural documents 50. This allows the user to feed the documents with sufficient time when the reading of a plurality documents 50 is performed. Furthermore, not the reading rate itself, but the time it takes from detecting the trailing end of the document 50 until the reading is to be finished may be made variable. In this case, the user can obtain sufficient time to set the subsequent documents 50, which facilitates to set the subsequent documents 50, and this also allows the user to perform feeding of the documents with sufficient time.

In the image-reading apparatus 1 according to the embodiment, the method of performing the reading of the plural documents 50 is not described. As for the detection method of performing the reading of the plural documents 50 by the image-reading apparatus 1, it may be detected based on the read operation when reading is performed. For example, by the depressed period of time of the scan switch 17 or by the operation of an application stored in the PC 35, a mode to perform the reading of a plural documents 50 may be set. Changing the reading mode based on the read operation in this manner can change the mode reliably.

Furthermore, by determining the leading end position of the first document 50 by the image-reading sensor 28, and depending on the position thereof, the mode may be shifted to the mode to read the plural documents 50 automatically. For example, when the leading end of the first document 50 is positioned only toward the right end of the insertion slot 7 in the width direction thereof, the size of the document 50 is small and a subsequent document 50 is likely to be inserted. In this case, the mode may be shifted to the mode to read a plural documents 50.

Alternatively, by coordinating the image-reading sensor 28 with the document detection sensor 20, the mode may be shifted to the mode to read a plural documents 50. For example, when the presence of document 50 is detected by the document detection sensor 20 even when the trailing end of the first document 50 is recognized by the image-reading sensor 28, the mode may be shifted to the mode to read a plural documents 50. Changing the reading mode automatically in response to the detection results of the image-reading sensor 28, for example, as in the foregoing enables the reading of the plural documents 50 to be performed easier.

The image-reading apparatus in accordance with the present invention has an effect that the images of a plurality of media can be acquired easily in a desired order.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-reading apparatus comprising:
   a housing having an insertion slot for inserting single medium or plural media;
   a medium detector that detects the single medium or plural media being inserted from any position of the insertion slot in a width direction thereof;
   a conveying unit that conveys the single medium or plural media detected by the medium detector to inside of the housing;
   an image capturing unit that captures an image of the single medium or plural media conveyed by the conveying unit;
   a control unit that controls at least the conveying unit and the image capturing unit; and
   an image processor configured to generate a captured image including single medium image or plural media image corresponding respectively to the single medium or plural media whose image has been captured by the image capturing unit, and clip a plurality of medium images that correspond respectively to media images in the plural media image off the captured image when the generated captured image includes the plural media image corresponding to the plural media in a direction along the width direction of the insertion slot, wherein the image processor outputs the plurality of medium images clipped in an order of insertion of the plural media inserted into the insertion slot.

2. The image-reading apparatus according to claim 1, further comprising:
   an abnormality determining unit that determines it to be abnormal when conveyance of the single medium or plural media is performed longer than a predetermined length by the conveying unit while the single medium or plural media being inserted is detected by the medium detector;
   a media-quantity determining unit that determines whether the single medium is inserted or the plural media are inserted into the insertion slot; and
   a notifying unit that notifies outside of abnormality when the abnormality determining unit has determined the abnormality, wherein the media-quantity determining unit determines whether the single medium is inserted or the plural media are inserted into the insertion slot based on the generated captured image when the abnormality determining unit has determined the abnormality.

3. The image-reading apparatus according to claim 2, wherein, when the media-quantity determining unit has determined that the plural media are inserted into the insertion slot, the notifying unit notifies that a medium image corresponding to a medium last inserted among the plural media inserted into the insertion slot has not been generated.

* * * * *